(12) United States Patent
Thomas

(10) Patent No.: US 7,299,839 B2
(45) Date of Patent: *Nov. 27, 2007

(54) DEBRIS COLLECTION SYSTEM FOR A PLANER

(75) Inventor: Roger Thomas, Stockton-on-Teas (GB)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/729,234

(22) Filed: Dec. 5, 2003

(65) Prior Publication Data

US 2004/0149352 A1  Aug. 5, 2004

(30) Foreign Application Priority Data

| Dec. 9, 2002 | (GB) | ................................. | 0228661.5 |
| Dec. 11, 2002 | (GB) | ................................. | 0228845.4 |
| Apr. 14, 2003 | (GB) | ................................. | 0308545.3 |
| Apr. 14, 2003 | (GB) | ................................. | 0308565.1 |

(51) Int. Cl.
*B27C 1/10* (2006.01)

(52) U.S. Cl. ................................ 144/154.5; 144/117.1; 144/252.1; 30/475

(58) Field of Classification Search ........... 144/136.95, 144/154.5, 114.1, 117.1, 252.1, 252.2; 30/475–477, 30/124; 409/137, 67, 182; 408/67
See application file for complete search history.

(56) References Cited

U.S. PATENT DOCUMENTS

| 157,369 | A | | 12/1874 | Brodhead |
| 1,281,207 | A | * | 10/1918 | Richens ........................ 30/475 |
| 1,296,911 | A | | 3/1919 | Bloodgood |
| 1,792,313 | A | | 2/1931 | La Measure et al. |
| 2,583,637 | A | * | 1/1952 | Draper ........................ 30/475 |
| 2,600,279 | A | * | 6/1952 | Spitzley ...................... 30/475 |
| 2,707,028 | A | | 4/1955 | Burton |
| 2,707,527 | A | | 5/1955 | Brace |
| 2,871,897 | A | | 2/1959 | Hesse et al. |
| 2,991,595 | A | | 7/1961 | Addis |
| 3,014,516 | A | | 12/1961 | Mueller |

(Continued)

FOREIGN PATENT DOCUMENTS

DE 1080764 4/1960

(Continued)

*Primary Examiner*—Shelley M. Self
(74) *Attorney, Agent, or Firm*—Scott B. Markow; Adan Ayala

(57) ABSTRACT

A planer comprising a body comprising an aperture formed within it to accommodate a deflector; the body being mounted on a shoe, the shoe having an aperture formed through it; a cutting drum rotatably mounted within a recess formed by a wall within the body; a motor mounted within the body to rotatingly drive the cutting drum; at least one cutting blade mounted on the periphery of the drum; an airflow generator which creates an air flow for entraining debris created by the cutting action of the blade; directional means which directs the airflow; and a removable deflector for guiding the airflow and entrained debris from within the body to outside of the body; wherein there is a pivotal flap which is capable of being pivoted between a first position where the entrance is closed and a second position where it is open.

10 Claims, 17 Drawing Sheets

U.S. PATENT DOCUMENTS

| | | | |
|---|---|---|---|
| 3,180,063 A | 4/1965 | Burrows et al. |
| 3,535,829 A | 10/1970 | Dudek |
| 3,566,548 A | 3/1971 | Beckering et al. |
| 3,583,821 A | 6/1971 | Shaub et al. |
| 3,902,284 A | 9/1975 | Hastily |
| 3,938,283 A | 2/1976 | Keith, Jr. |
| 3,952,484 A | 4/1976 | VanSwearingen |
| 4,105,420 A | 8/1978 | Moore |
| 4,118,897 A | 10/1978 | Martin |
| 4,192,104 A | 3/1980 | Patenaude |
| 4,334,390 A | 6/1982 | Sumerau |
| 4,598,500 A | 7/1986 | Faraudo et al. |
| 4,601,104 A | 7/1986 | Zaiser et al. |
| 4,758,023 A | 7/1988 | Vermillion |
| 4,967,516 A | 11/1990 | Hoshino et al. |
| 5,237,781 A | 8/1993 | Demetrius |
| 5,341,605 A | 8/1994 | Tasikas |
| 5,349,752 A | 9/1994 | Stirm |
| 5,383,275 A | 1/1995 | Hild et al. |
| 5,419,737 A | 5/1995 | Brazell et al. |
| 5,463,816 A | 11/1995 | Bellew et al. |
| 5,493,398 A | 2/1996 | Pfister |
| 5,518,442 A | 5/1996 | Clowers et al. |
| 5,529,202 A | 6/1996 | Shamis |
| 5,595,531 A | 1/1997 | Niemela et al. |
| 5,791,977 A | 8/1998 | Clowers et al. |
| 5,815,934 A | 10/1998 | Eichberger et al. |
| 5,833,524 A | 11/1998 | Satoh et al. |
| 5,878,607 A | 3/1999 | Nunes et al. |
| 5,934,985 A | 8/1999 | Clowers et al. |
| 5,960,983 A | 10/1999 | Chan |
| 5,974,626 A | 11/1999 | Wood et al. |
| 6,047,693 A | 4/2000 | Yamami et al. |
| 6,159,085 A | 12/2000 | Hara |
| 6,224,471 B1 | 5/2001 | Clowers et al. |
| 6,256,832 B1 | 7/2001 | Dyson |
| 6,481,475 B1 | 11/2002 | Liao et al. |
| 6,514,131 B1 | 2/2003 | Reich et al. |
| 6,520,365 B2 | 2/2003 | Schneider |
| D475,594 S | 6/2003 | Bian |
| 6,601,621 B2 | 8/2003 | Wixey et al. |
| 6,629,548 B1 | 10/2003 | Chiang |
| 6,688,349 B2 | 2/2004 | Razlan et al. |
| 6,712,106 B1 | 3/2004 | Wang |
| 2002/0174774 A1 | 11/2002 | Chen |

FOREIGN PATENT DOCUMENTS

| | | |
|---|---|---|
| DE | 31 13496 A1 | 10/1982 |
| DE | 31 26511 A1 | 3/1983 |
| DE | 3406728 | 8/1985 |
| DE | 35 42 263 A1 | 6/1987 |
| DE | 3542263 | 6/1987 |
| DE | 3542466 | 6/1987 |
| DE | 38 43 912 A1 | 6/1990 |
| DE | 39 15 084 C | 6/1990 |
| DE | 43 10 280 A1 | 10/1994 |
| DE | 19535248 | 4/1996 |
| DE | 195 12 262 A | 9/1996 |
| DE | 195 30 542 A | 2/1997 |
| DE | 198 51 064 A1 | 6/1999 |
| DE | 198 32 005 A1 | 1/2000 |
| DE | 29812699 | 1/2000 |
| DE | 100 35 437 A | 2/2002 |
| EP | 0 279 047 A | 8/1988 |
| EP | 0 558 253 A | 9/1993 |
| EP | 1 247 612 A | 10/2002 |
| GB | 249881 | 8/1926 |
| GB | 2 137 896 A | 10/1984 |
| GB | 23 39 720 A | 2/2000 |
| GB | 2343393 | 5/2000 |
| GB | 2 371 968 A | 8/2002 |
| JP | 03223002 | 10/1991 |
| JP | 2002 326160 A | 11/2002 |
| WO | WO95/34238 | 12/1995 |

* cited by examiner

DEBRIS COLLECTION SYSTEM FOR A PLANER

The present invention relates to a planer and in particular to debris collection containers for a planer and airflow and chip removal in a planer.

BACKGROUND OF THE INVENTION

Planers comprise a body mounted on a shoe. A rotatable cutting drum is mounted within the body which is rotatingly driven by an electric motor also mounted within the body. An aperture is formed through the shoe through which part of the periphery of the cutting drum extends. Cutting blades are mounted on the drum which, as the drum rotates, periodically pass through the aperture and below the shoe. In use, the shoe is located on a work piece and the drum is rotatingly driven by the motor. When the blades pass through the aperture and move below the shoe, the blades engage with the workpiece and remove a thin slice of the workpiece from the surface of the workpiece, producing shavings or chips. Due to the rotational movement of the drum, the shavings or chips are thrown in a generally forward and upward direction in relation to the planer. One problem is the removal of the shavings or chips from the cutting area of the planer. A second problem is the collection of the shavings or chips for disposal.

In some designs of planer, the chips or shaving are directed using a deflector which directs the shavings or chips side ways from the planer. A fan or impeller mounted on the drive shaft of the motor can be used to generate an airflow which can be used to assist in the removal of the shavings or chips. DE19512262 discloses such a system. However, the problem with existing designs are that they are not efficient at mixing the air flow with the shavings or chips to entrain them for removal.

In order to collect the chips or shavings, a debris collection container is attached to the aperture through which the chips or shavings are ejected from the body of the planer. Existing designs of debris collection containers comprise a metal wire frame which is covered by a cloth bag such as a canvas bag. A tubular connector is attached to the metal wire frame and cloth bag and which can be attached to the ejection aperture so that the chips or shavings can pass through the connector from the planer to the debris collection container. A zipper is sewn into the side of the cloth bag which, when opened forms an aperture through which the shavings or chips can be emptied from the cloth bag. A problem with this design is that the hole formed by the unopened zipper is narrow making emptying the bag difficult. Furthermore, it is difficult for an operator to insert a hand into the bag to assist in the removal of the shavings or chips. The zipper can also scratch the hand of the operator. The shavings or chips can further interfere with the operation of the zipper.

BRIEF DESCRIPTION OF THE INVENTION

Accordingly there is provided a planer comprising a body comprising an aperture formed within it to accommodate a deflector the aperture having at least one entrance 212;

the body being mounted on a shoe, the shoe having an aperture formed through it;

a cutting drum rotatably mounted within a recess formed by a wall within the body, a part of the periphery of the cutting drum 6 projecting through the aperture in the shoe;

a motor mounted within the body to rotatingly drive the cutting drum;

at least one cutting blade mounted on the periphery of the drum capable of planing a work piece when the drum is rotating;

an airflow generator which creates an air flow when the planer is in use within the body for use for entraining debris created by the cutting action of the blade to assist in the removal of the debris;

directional means which directs the airflow within the body towards the area where the cutting blade cuts a work piece in order to entrain the debris in the airflow within the body for removal from the body; and a removable deflector for guiding the air flow and entrained debris from within the body to outside of the body when located within the aperture;

wherein there is provided a movable flap 200 which is capable of being moved between a first position where it covers the entrance 212 of the aperture 200 and a second position where at least part of the entrance 212 is uncovered.

BRIEF DESCRIPTION OF THE DRAWINGS

A number of embodiments of the invention will now be described with reference to the following drawings of which.

DETAILED DESCRIPTION OF THE INVENTION

Figure 1:
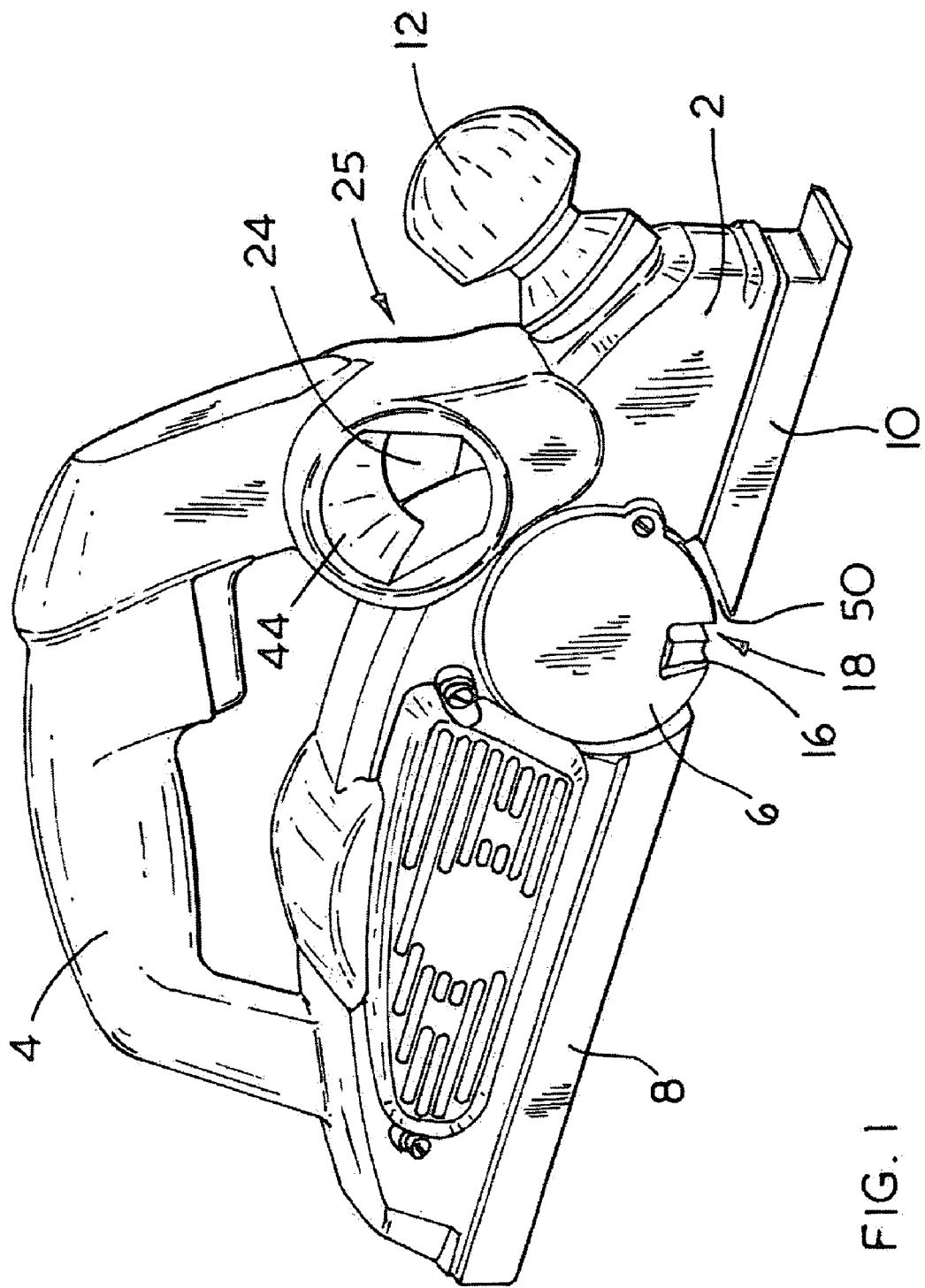
FIG. 1 shows a side view of the planer with the deflector removed.
Figure 2:
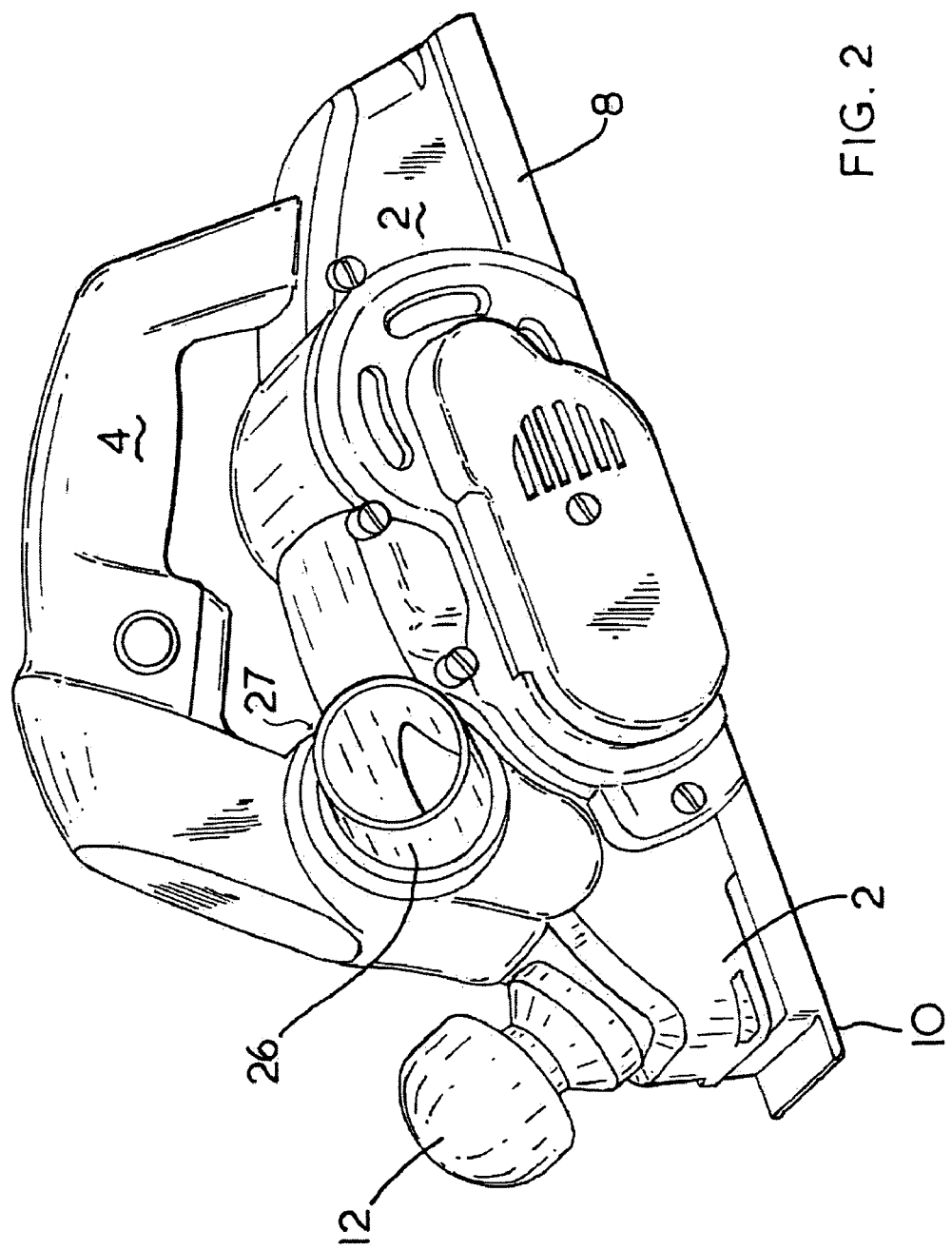
FIG. 2 shows a side view of the planer of FIG. 1 with the deflector inserted.

A first embodiment of the planer will now be described with reference to FIG. 1 to 5. The planer comprises a body 2 having a handle 4 attached to the top of the body 2. A cutting drum 6 is rotatingly mounted within a recess 50 in the body 2 of the planer. The body 2 of the planer is mounted on a shoe formed from two pieces 8, 10. The rear part 8 is mounted rearwardly of the drum 6. The forward part 10 is mounted forward of the drum 6. An aperture 18 in the shoe is formed by the front 10 and rear sections of the shoe through which part of the periphery 20 of the cutting drum 6 extends. The height of the forward part 10 of the shoe can be adjusted in relation to the body 2 by the rotation of a knob 12 mounted on the front of the body 2 of the planer. The operation of the knob 12 is well known and will not therefore be discussed any further.

Mounted within cavity 14 of the body 2 of the planer is an electric motor 15 (shown schematically). The electric motor 15 rotatingly drives the cutting drum 6 via a drive belt (not shown). Cutting blades 16 are mounted within the cutting drum 6 and cut the workpiece upon which the planer is mounted as the cutting drum rotates. The cutting blades 16, as the drum 6 rotates, periodically pass through the aperture 18 and below the shoe to cut the workpiece in a well known manner. The construction of the electric motor 15, the cutting drum 6, the cutting blades 16 and the belt drive system are well known in the art and are therefore not discussed any further.

Formed through the full width of the body 2 of the planar is a tubular exhaust aperture 24 having two entrances: first exhaust aperture 25 and second exhaust aperture 27. A deflector 26 which is described in more detail below can be inserted into the aperture 24 from either side. This enables the shavings or chips to be directed to either side of the planar. A plastic cap (not shown) is used to seal the other aperture.

Figure 3:
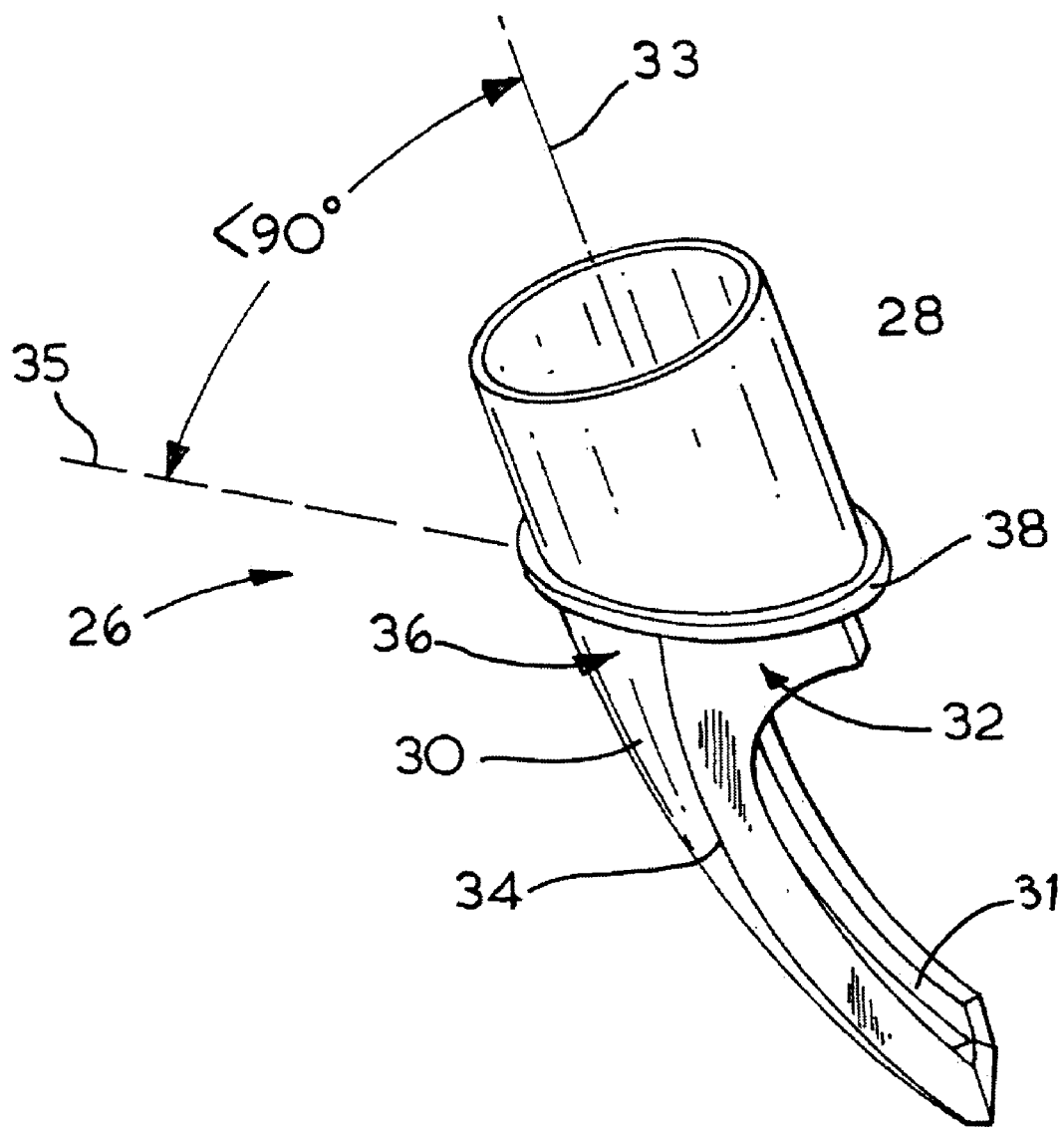
FIG. 3 shows the design of the deflector for use in the planer.
Figure 4:
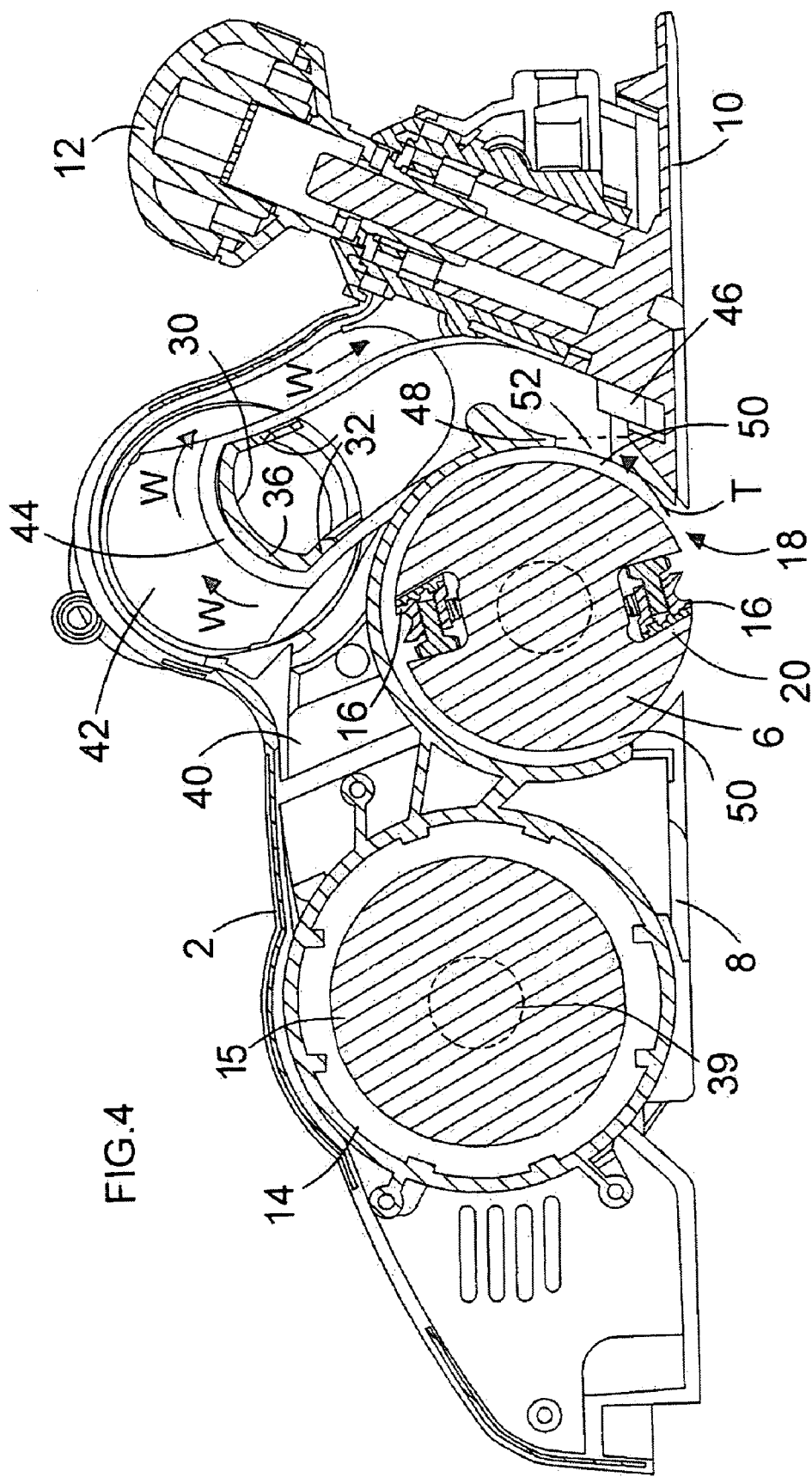
FIG. 4 shows a lengthwise vertical cross section of the planer of FIG. 1 through the centre of the planer (excluding the motor and handle)
Figure 5:
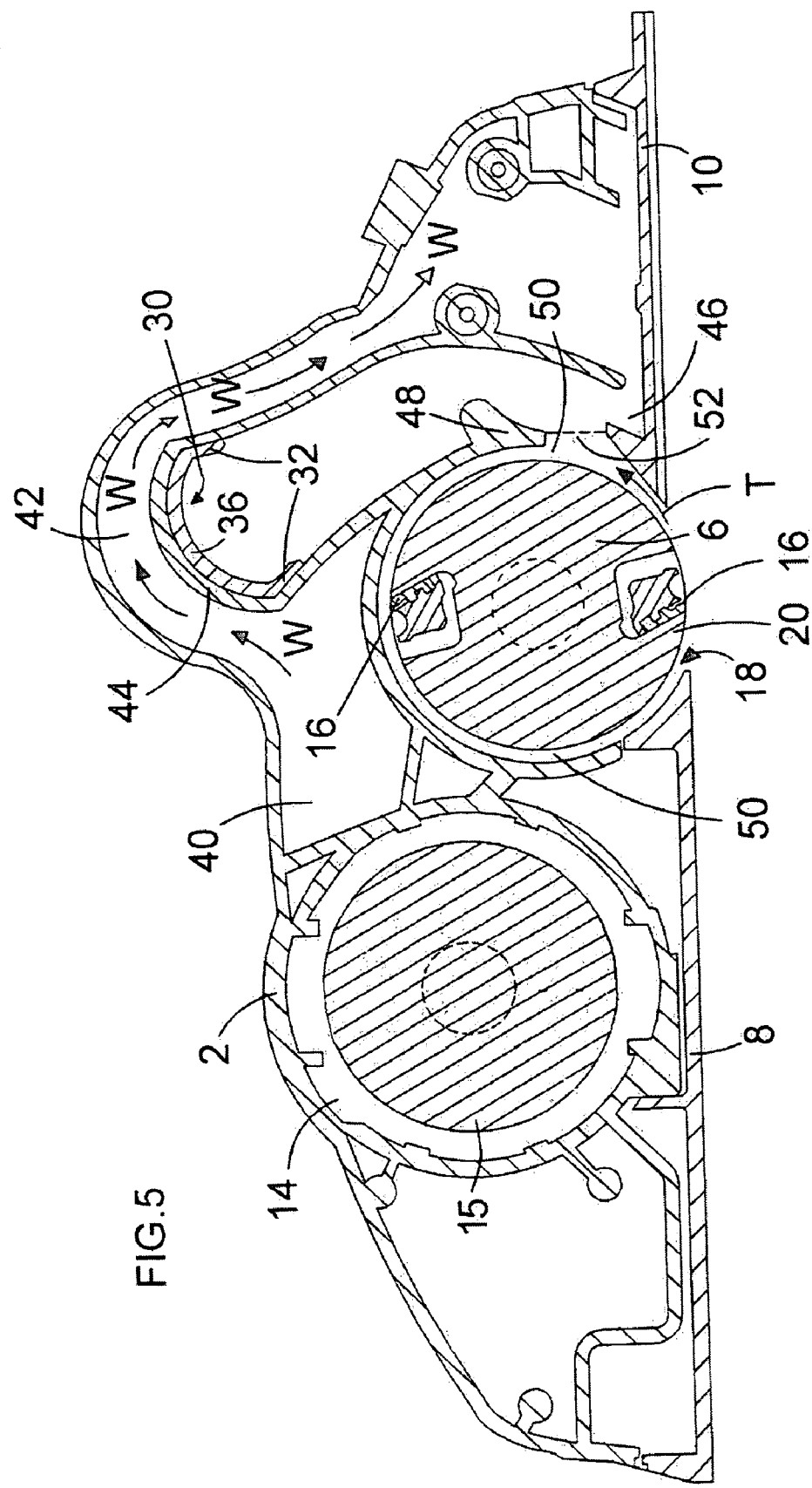
FIG. 5 shows a lengthwise vertical cross section taken through the planer of FIG. 1 at the position indicated by dashed line Z in FIG. 2 (excluding the handle)

Referring to FIG. 3, the deflector 26 in accordance with the present invention is shown. The deflector 26 comprises two sections 28, 30. The first outer section 28 is a tube of circular cross-section which, when the deflector 26 is inserted into the aperture 24 of the planer, projects outwardly from the body 2 of the planer shown in FIG. 2. The second section 30 is a curved section. The curved section has a substantially U shaped cross-section which forms a trough 31 which curves over its length. The sides 32 of the U-shaped curved trough 31 have been flattened as best seen in FIGS. 4 and 5. This results in a ridge 34 along the length of the curved section 30 where the flat surface 32 meets with a curved surface 36 of the U shaped cross section. The shape of the cross-section of the curved section 30 of the deflector 26 is such that it fits snugly into the aperture 24 in the side wall of the body 2 of the planer in order to hold the deflector 26 securely and preventing it from rotating within the aperture 24. Formed between the two sections 28, 30 is an annular rib 38 which surrounds the circumference of the deflector 26. The outer diameter of the annular rib 38 is greater than the diameter of the aperture 24 and thus prevents the deflector 26 from being inserted too far into the planer. When the deflector 24 is located within the body 2 of the planer, the rib 38 abuts against a side wall of the body 2 of a planer, the tubular section 28 remaining outside of the body. The rib is angled 35 in relation to the longitudinal axis 33 of the tubular section 28 so that it is less than ninety degrees as shown in FIG. 3. This is to allow the tubular section to point upwards when located within the body of the planer. The deflector 26 is formed as a one-piece construction and is made from plastic molded into the appropriate shape.

Mounted on the drive spindles of the motor 15 is a fan 39 (shown schematically) which generates an airflow. The air is directed into a cavity 40 formed in the body of the planer. The air then passes through a conduit 42 over the top wall 44 which forms the top wall of the aperture 24. The direction of the airflow is indicated by Arrows W. The airflow is then directed downwardly to an area 46 in the body 2 forward of the wall 48 of the recess 50 in which the drum 6 is mounted. An expulsion aperture 52 is formed in the wall 48 of the recess 50 forward of the cutting drum 6 through which any debris created by the cutting action of the blades 16 would be thrown by the rotating blades 16. The airflow W is directed within the body to a point 46A below the expulsion aperture 52 in the wall of the recess and is directed to be blown across the aperture 52 within the body in a direction W having an acute angle to the direction of travel of any debris (shown by Arrow T) in order to entrain the debris in the airflow within the body.

The airflow and entrained debris is directed upwardly until it engages with the underside of the curved section 30 of the deflector 26 which is located within the aperture 24 when the planer is in use. The airflow and entrained debris is then directed out of the side of the planer through the tubular section 28 and into a debris collection container.

Figure 13:
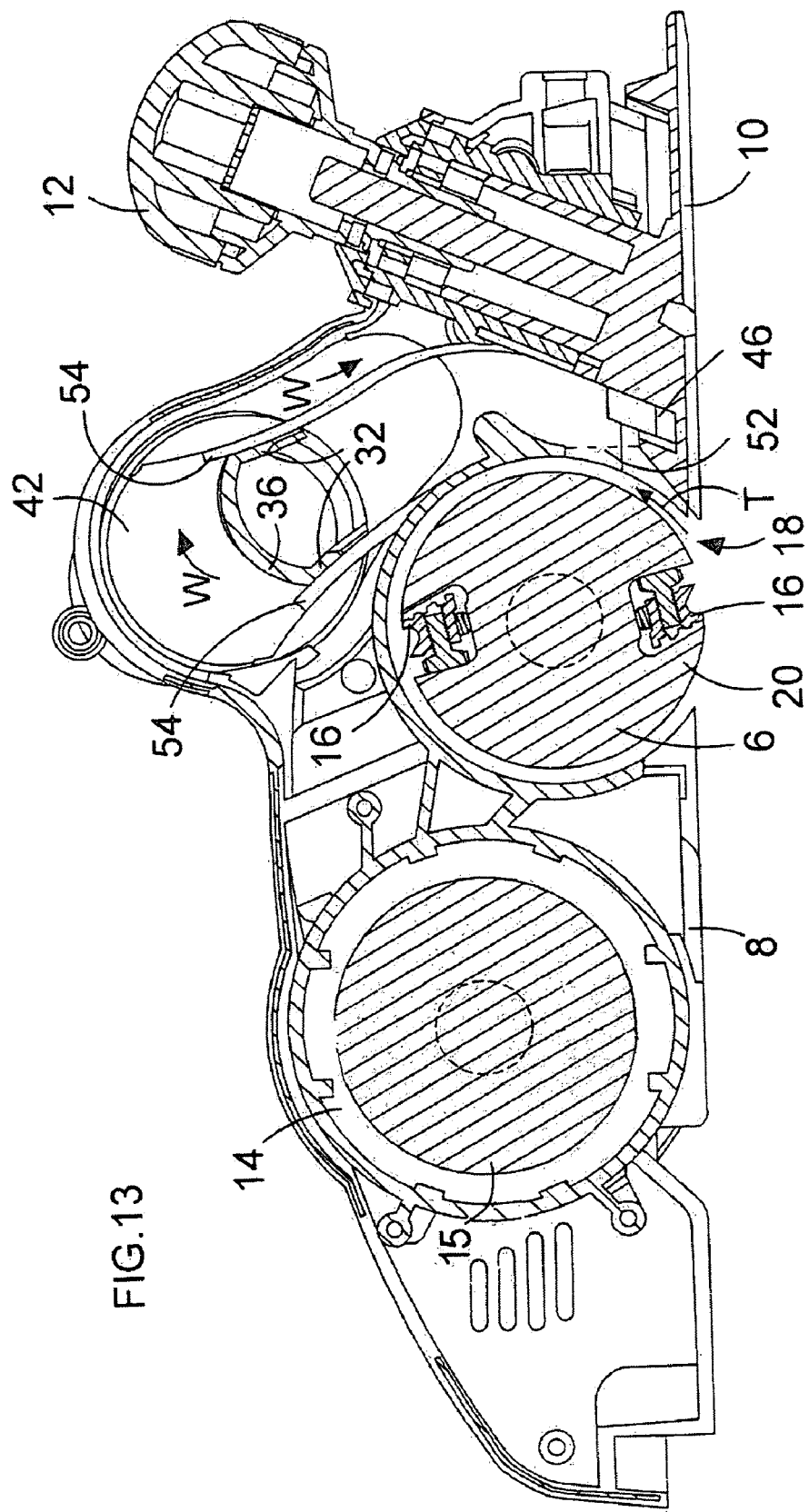
FIG. 13 shows a lengthwise vertical cross section of the second embodiment of the planer through the centre of the planer (excluding the motor and handle)
Figure 14:
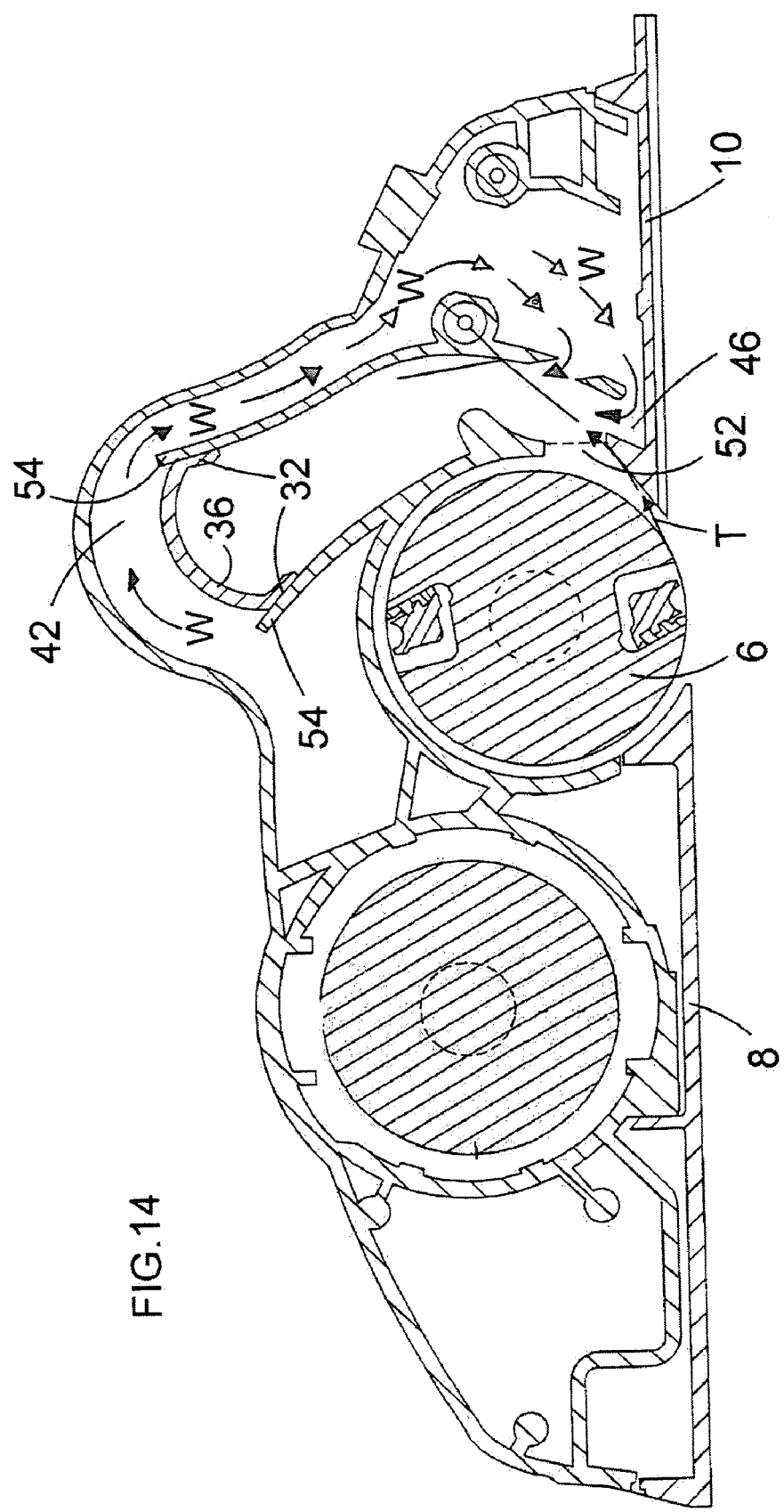
FIG. 14 shows a lengthwise vertical cross section taken through the planer of FIG. 13 (excluding the handle)
Figure 15:
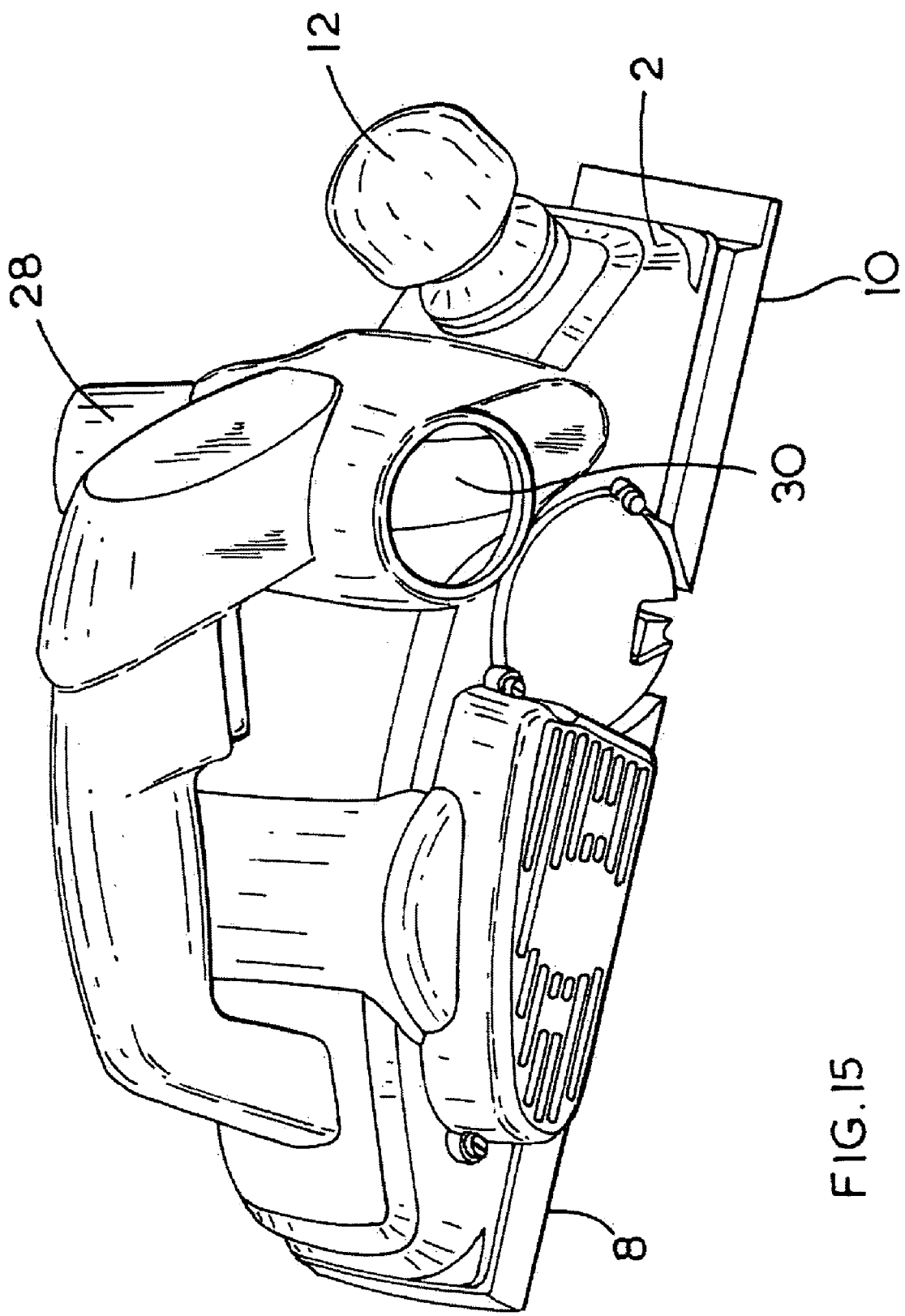
FIG. 15 shows a downward side view of the planer of FIG. 13 with the deflector inserted.

A second embodiment of the planer will now be described with reference to FIGS. 13 to 15. Where the same features are shown in second embodiment are the same as those in the first, the same reference numbers have been used. The second embodiment is exactly the same as the first embodiment except that the curved section 30 of the deflector forms the lower wall of the conduit 42 through which the airflow is directed over the deflector 26. The aperture has no upper wall within the body 2 of the planer.

When the deflector 26 is located within the aperture 24, the flat side walls 32 of the deflector 26 engage with internal walls 54 of the body and form an air tight seal preventing air which is passing over the deflector 26 from travelling between the flat walls 32 of the deflector and the internal wall 54 of the body ensuring it travels forward and downward to the point 46 below the expulsion aperture 52 for entraining of the debris.

Because the deflector 26 is angled downwardly by the angle 35 of the rib 38 being non perpendicular to the longitudinal axis 33 of the deflector, a large cavity is formed above the deflector 26 allowing air to easily pass over the top of the deflector 26. FIG. 15 shows a planer according to the second embodiment. The curve section 30 can be seen through the entrance of the aperture 24.

Figure 16:
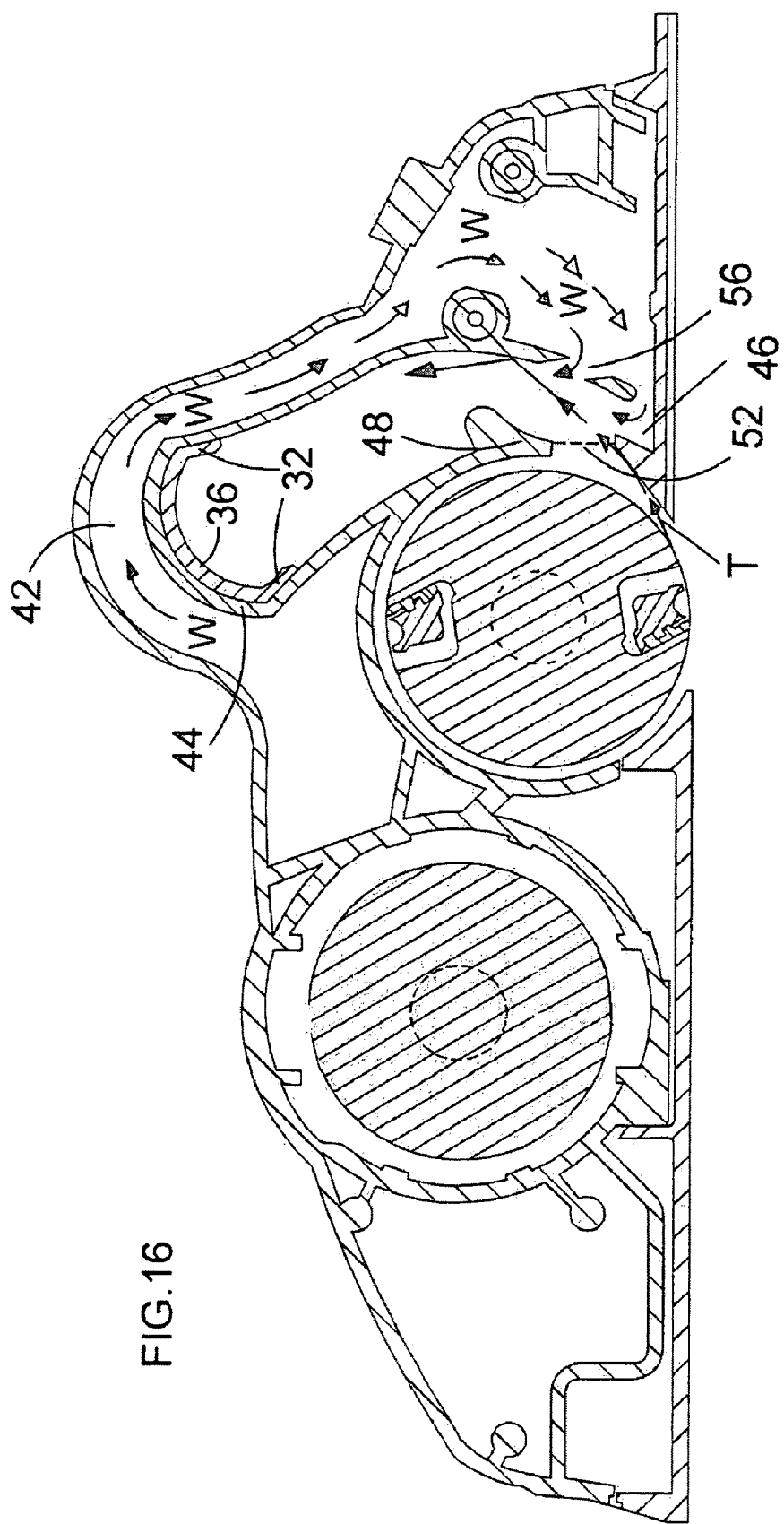
FIG. 16 shows a lengthwise vertical cross section taken through the third embodiment of the planer (excluding the handle)

A third embodiment of the planer will now be described with reference to FIG. 16. Where the same features are shown in third embodiment are the same as those in the first, the same reference numbers have been used. The third embodiment is exactly the same as the first embodiment except that a vent or nozzle 56 has been added within the body above the area 46 in the body 2 forward of the wall 48 of the recess 50 in which the drum 6 is mounted. The nozzle 56 directs air into the path of the air with entrained debris at an acute angle approximately at the same height as the top of the expulsion aperture 52 formed in the wall 48 of the recess 52 forward of the cutting drum 6 through which any debris created by the cutting action of the blades 16 would be thrown by the rotating blades 16. It will be appreciated that the vent 56 can be located slightly lower down relative to the adjacent aperture 52.

A fourth embodiment of the planer will now be described with reference to FIGS. 17 and 18. Where the same features are shown in the fourth embodiment are the same as those shown in the first embodiment, the same reference numbers have been used. The fourth embodiments is similar to the first embodiment except that a curved pivotal flap 200 is pivotally mounted within the aperture 24 where the deflector 26 is located.

The curved pivotal flap 200 is mounted about an axis 202 which extends in a vertical plane through the center of the width of the body 2 of the planer. The axis 202 is angled downwardly by a small amount relative to the horizontal so that the curved pivotal flap 200 pivots between an internal wall 206 of the body of the planer forming the top wall of the aperture 24 to the bottom side wall 208 of the entrance of the aperture 24. The curved pivotal flap 200 extends from the axis of pivot 202 to the right side 204 of the body 2 of the planer as shown in FIGS. 17 and 18. The curved pivotal flap 200 is capable of pivoting from a position indicated by reference letter Q through the position indicated by reference letter R shown in dashed lines in FIG. 17 to a position indicated by reference letter S also indicated in FIG. 17 by dashed lines but shown as a solid line in FIG. 18. A spring 209 biases the curved pivotal flap to the lower position indicated by reference letter Q as shown in FIG. 17.

When the deflector 26 is not located within the planer, the curved pivotal flap 200 is biased to a downward position indicated by reference letter Q. When the flap 200 is located in this position, it forms an upper wall for right half of the aperture 24 as viewed in FIG. 17 which is aligned with the upper wall 210 of the left hand side of the aperture 24 formed by the internal structure of the body 2 of the planer to produce a continuous curved upper surface of the aperture 24. When the curved pivotal flap is in its downward position, it completely blocks the right hand entrance 212 to the aperture 24 from the chamber 214 where the air and entrained debris pass from the drum in order to be expelled.

Figure 17:
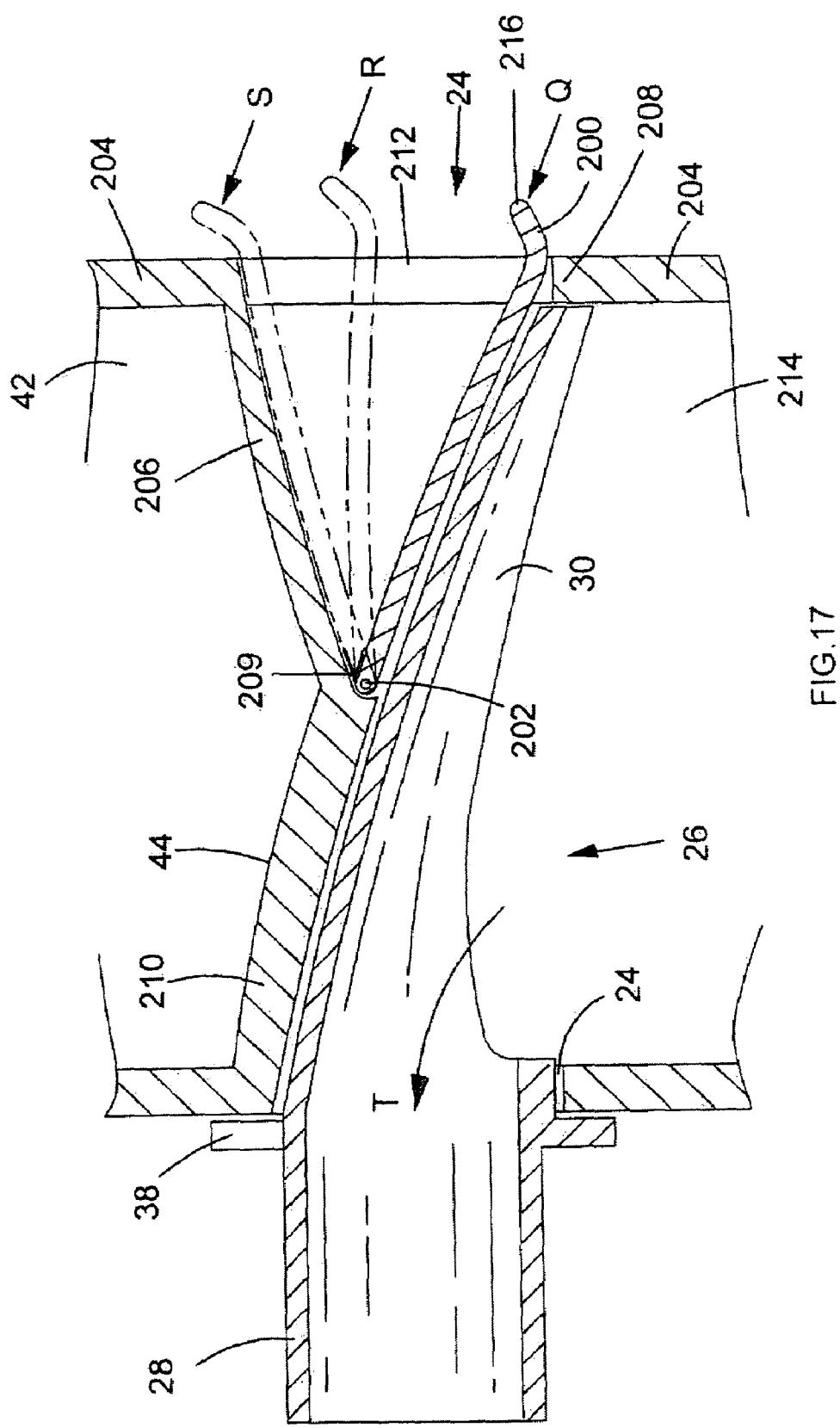
FIG. 17 shows a vertical cross-section of the deflector located in a first position within the planer in accordance with the fourth embodiment of the planer.

When the deflector 26 is inserted into the aperture 24 from the left-hand side as shown in FIG. 17, the second section 30 of the deflector 26 is located adjacent the upper wall 210 of the left hand side of the aperture 24 formed by the internal structure of the body 2 and by the curved pivotal flap 200 on the right hand side of the aperture 24. The insertion of the curved second section 30 of the deflector 26 causes no movement of the curved pivotal flap 200. The shape of the curved pivotal flap 200, both in cross-section and lengthwise, is such that it lies flush against the end part of the curved second section 30 of the deflector 26.

Figure 18:
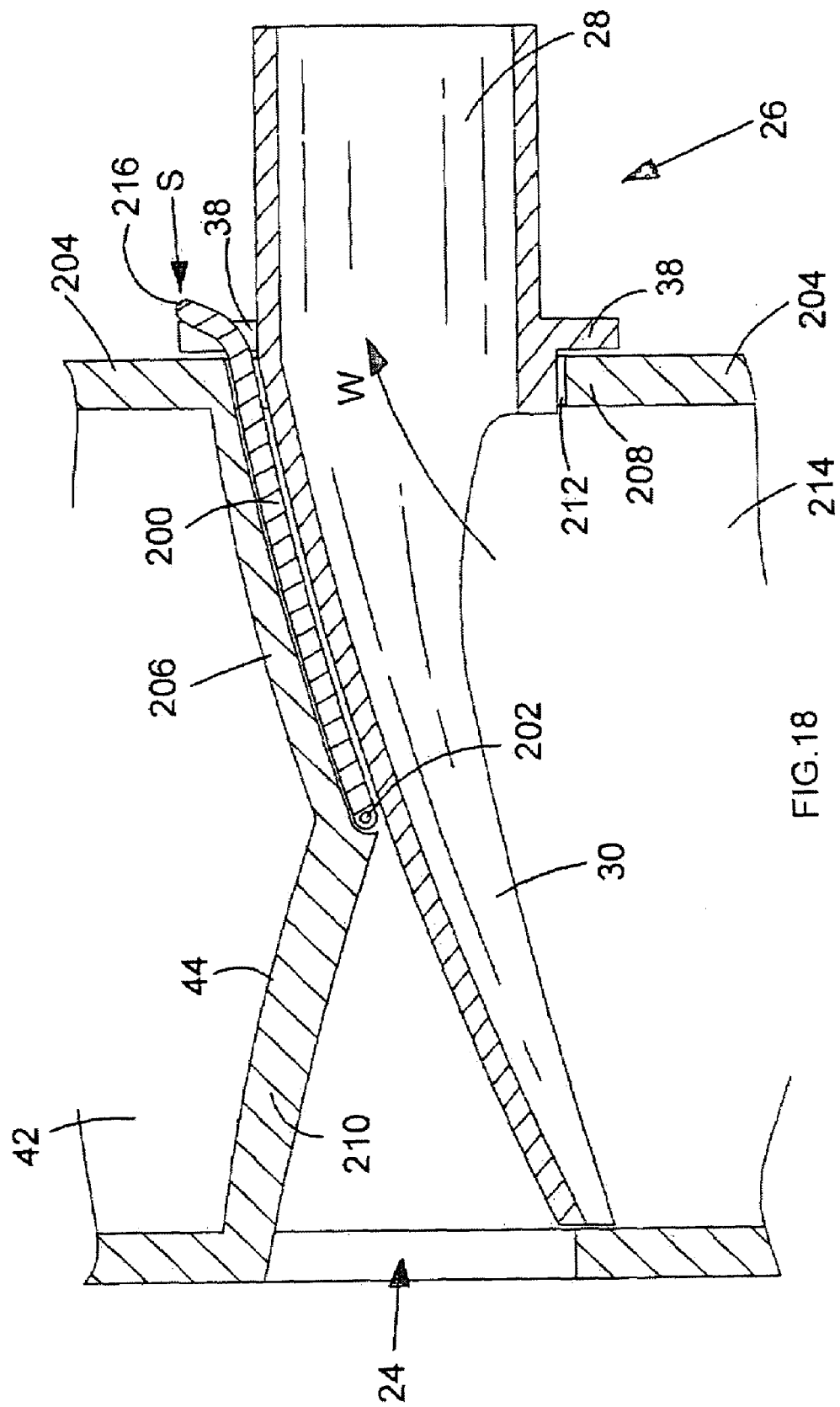
FIG. 18 shows a vertical cross-section of the deflector located within the planer in a second position in accordance with the fourth embodiment of the planer.

When an operator tries to insert the deflector 26 from the right-hand side of the planer as shown in FIGS. 17 and 18, the curved second section 30 of the deflector 26 is prevented from entering the aperture 24 by the curved pivotal flap 200 being located in its lower position indicated by reference letter Q due to the biasing force of the spring. In order for an operator to insert the deflector 26 into the aperture 24, the operator pivots the curved pivotal flap 200 against biasing force of the spring from the position indicated by reference letter Q to the position indicated by reference letter S as shown in FIG. 18. The operator can then insert the deflector 26 into the aperture 24. When the curved second section 30 of the deflector 26 is located within the body to of the planer, the curved pivotal flap 200 is sandwiched between the internal wall of the body to of the planer and the second section 30 of the deflector, the shape of the curved pivotal flap 200 again being such that it lies flush against the curved second section of the deflector 26.

A grip portion 216 is attached to the end of the curved pivotal flap 200 to enable the fingers of an operator to push the curved pivotal flap against biasing force of the spring.

The deflector 26 deflects the air and any entrained debris or chips either to the left when the deflector 26 is located from the left-hand side as shown in FIG. 17 in the direction indicated by reference letter T or to the right when the deflector 26 is located from the right-hand side of the planer as shown in FIG. 18 indicated by letter W. When the deflector is not inserted into the aperture 24, the curved pivotal flap 200 is in its lowest position as indicated by reference letter Q, blocking the right hand entrance 212 of the aperture. As such, if the planer is operated without the deflector 26 inserted, the curved shape of the curved pivotal flap with the internal wall will direct the air and any entrained debris or chips towards the left enabling the planer to operate as if the deflector 26 was inserted into the left hand side of the body to of the planer.

Figure 6:
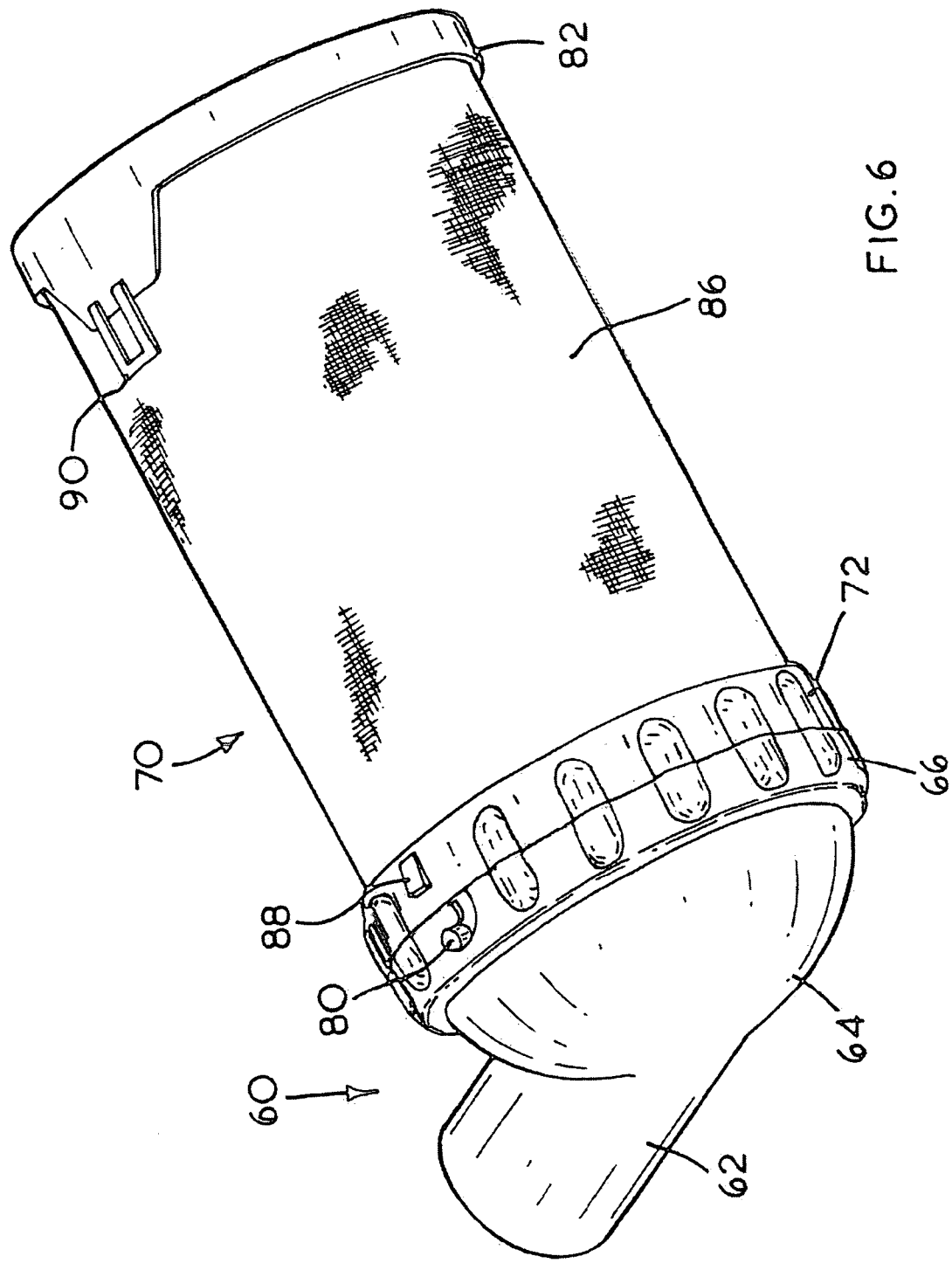
FIG. 6 shows a perspective view of the first embodiment of a debris collection container.
Figure 7:
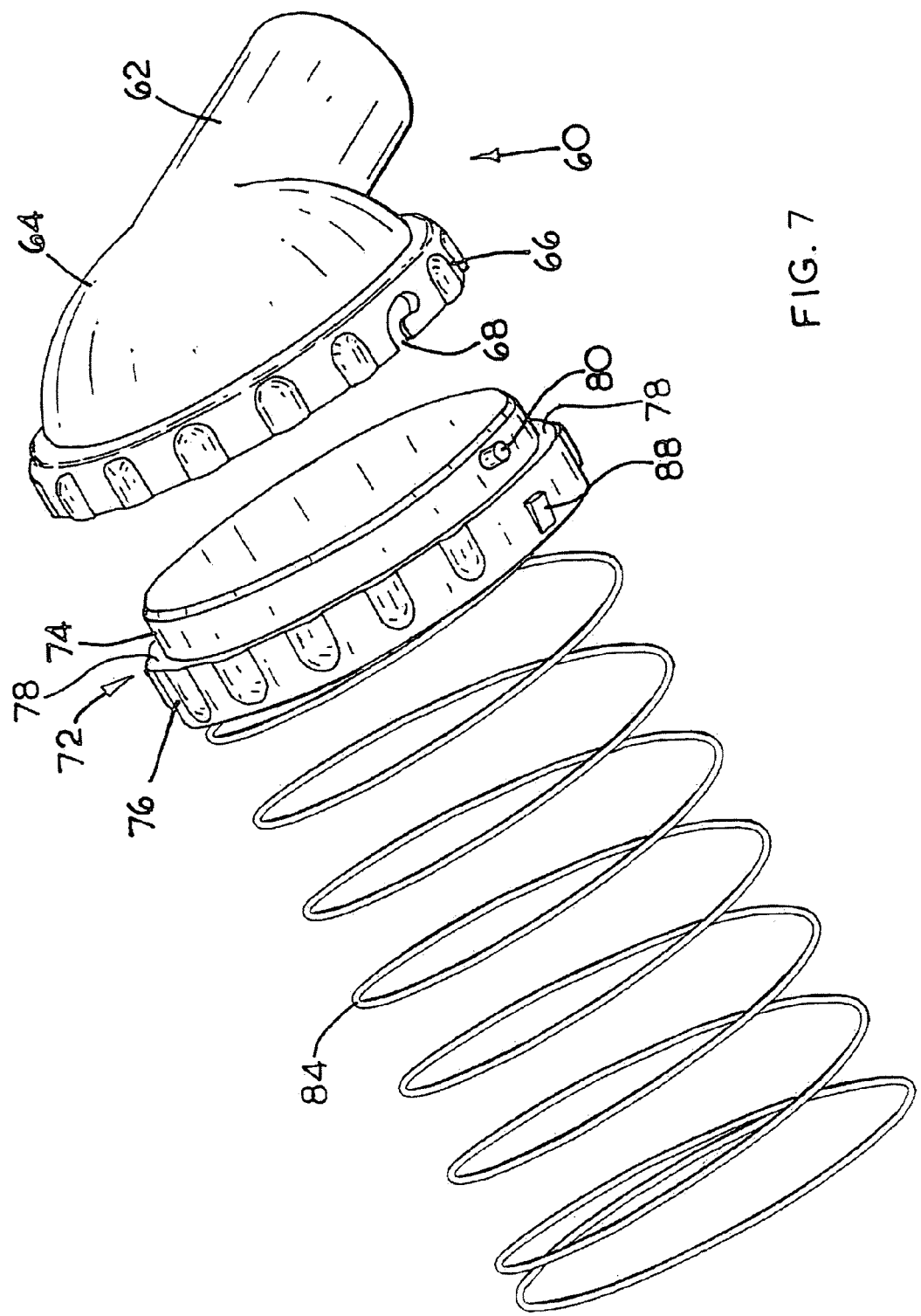
FIG. 7 shows an exploded view of the debris collection container of FIG. 6 excluding the cloth bag and circular end piece.
Figure 8:
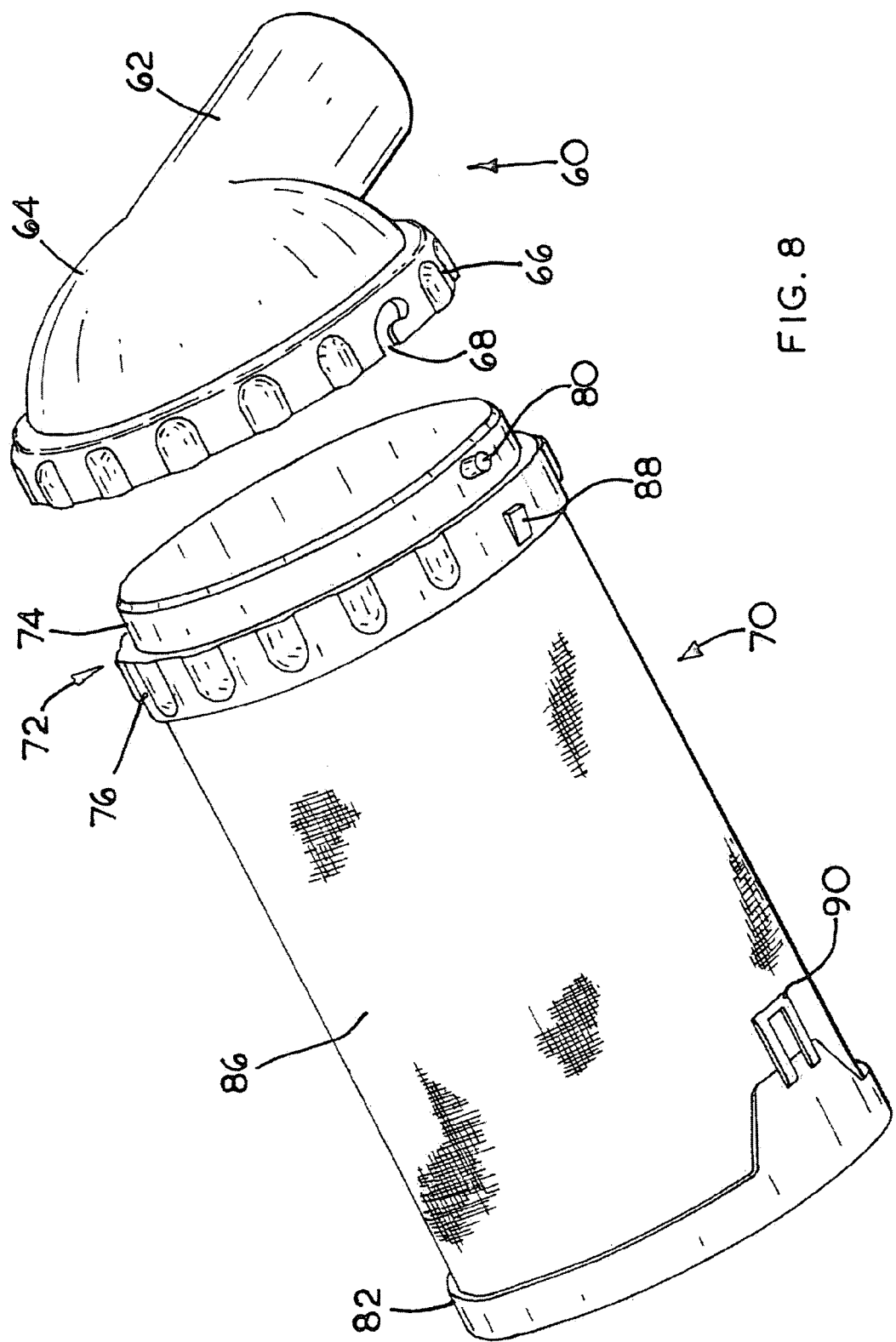
FIG. 8 shows a perspective view of the debris collection container of FIG. 6 with the cap detached from the receptacle.

FIGS. 6 to 8 show a first embodiment of a debris collection container which can be used with any of the four embodiments of planer previously described. The debris collection container comprises two sections, an end cap section 60 and the receptacle 70. The end cap section 60 is manufactured in a one-piece construction from transparent plastic. The end cap section 60 comprises a tubular connection section 62 which connects to the first tubular section 28 of the deflector 26. The tubular connection section 62 has a circular aperture (not shown) at one end whilst the other end meets with a dome shaped section or part spherical section 64. The dome shaped section 64 comprises a rim 66 which surrounds a large aperture formed in the base of the dome shape section 64. The rim 66 comprises an L-shaped slot 68 which forms part of a bayonet connection system for use in connecting the end cap section 60 to the receptacle 70. Air and entrained debris pass through the aperture in the end of the tubular connection section 62, through the tubular connection section 62 and into the dome shape section 64 before being expelled from the end cap section 60 through the large aperture in the base of the dome 64. The shape of the dome is such that it acts as a deflector, bending the air and entrained debris through ninety degrees so that the air and entrained debris are travelling perpendicular to the direction they were travelling in when they were passing through the tubular connection section 62. By constructing the dome shape section 64 in transparent plastic, the operator of the planer can look into the debris collection container to determine how full container is. Furthermore, as the planer is operating, the operator will be able to see the entrained debris passing through the tubular connection section 62 and pass through the dome section thereby enabling the operator to see that the planer is working correctly.

The receptacle 70 comprises a one end an annular plastic ring 72 which surrounds a large circular aperture which forms of the entrance to the receptacle 70. The annular plastic ring 72 is divided lengthwise into two halves, a front half 74 having a diameter less than that of the in the diameter of the rim 66 of the dome shaped section 64 of the end cap section 60, and a second rear half 76 having a diameter equal to that of the outer diameter of the rim of the dome shape section 64 of the end cap section 60. A lip 78 is formed between the front and rear sections 74, 76 which abuts against the side of the rim of the dome shaped section 64 of the end cap section 60 when the end cap section is connected to the receptacle. Two pins 80 project radially outwardly from the surface of the front half. The pins are used as part of a bayonet connection to connect the end cap section to the receptacle by sliding into the L-shaped slot 68 formed in the rim 66 of the end cap section in connecting receptacle to the end cap section 60 in well known manner.

Located at the other end of the receptacle is a circular end piece 82 formed from plastic. The circular end piece forms a base of the receptacle and can be manufactured from transparent plastic material to enable an operator to view inside the receptacle from the base. The circular end piece 82 has a diameter which is the same as that of the annular plastic ring 72. A helical spring 84 having the same diameter as that of the annular plastic ring 72 and the circular end piece 82 connects between the annular plastic ring 72 and the circular end piece 82 and holds the relative positions of the two parts. A tubular shaped cloth bag 86 connects between the plastic annular ring 72 and the circular end piece 82 and surrounds the helical spring. The spring acts to maintain the shape of the circular receptacle and to keep the circular cloth sheaf in shape.

Formed on the annular plastic ring is a plastic catch 88. Formed on the circular end piece is a U-shaped plastic loop 90 which extends from that the circular end piece 82 towards the annular plastic ring 72. The location of the U-shaped plastic loop 90 results in that when that the helical spring 84 is compressed by moving the circular end piece 82 towards the annular plastic ring 72, the loop 90 engages with and attaches to the plastic catch 88. This is ideal for storage. During use, the U-shaped plastic loop 90 is released from the catch and allows the helical spring 84 to bias the circular end piece 82 away from the annular plastic ring 72 to maximize the volume of space within the receptacle 70. The helical spring maintains the shape of the receptacle the relative positions of the plastic annular is ring 72 and the circular end piece 82. However, due to the resilient nature of the helical spring 84, the structure allows some relative movements between the two enabling flexibility within the receptacle. However, when the receptacle is not in use, the helical spring 84 can be compressed so that the circular end piece 82 is moved towards the annular plastic ring 72 until the U-shaped plastic loop 90 engages with the plastic catch 88 to secure the circular end piece 82 to the annular ring 72 maintaining the helical spring 84 under compression and substantially reducing the volume of the space within the receptacle. This is ideal for storage purposes.

In use, the tubular connection section of the end cap is connected to the deflector 26 on the planer. The receptacle 70 is connected to the end cap section by use of the bayonet connector. The circular end piece 82 is disconnected from the catch 88 on the annular plastic ring 72 to allow the helical spring 84 to bias the circular end piece 82 away from the plastic annular ring 72 generating the shape of the container.

Figure 9:
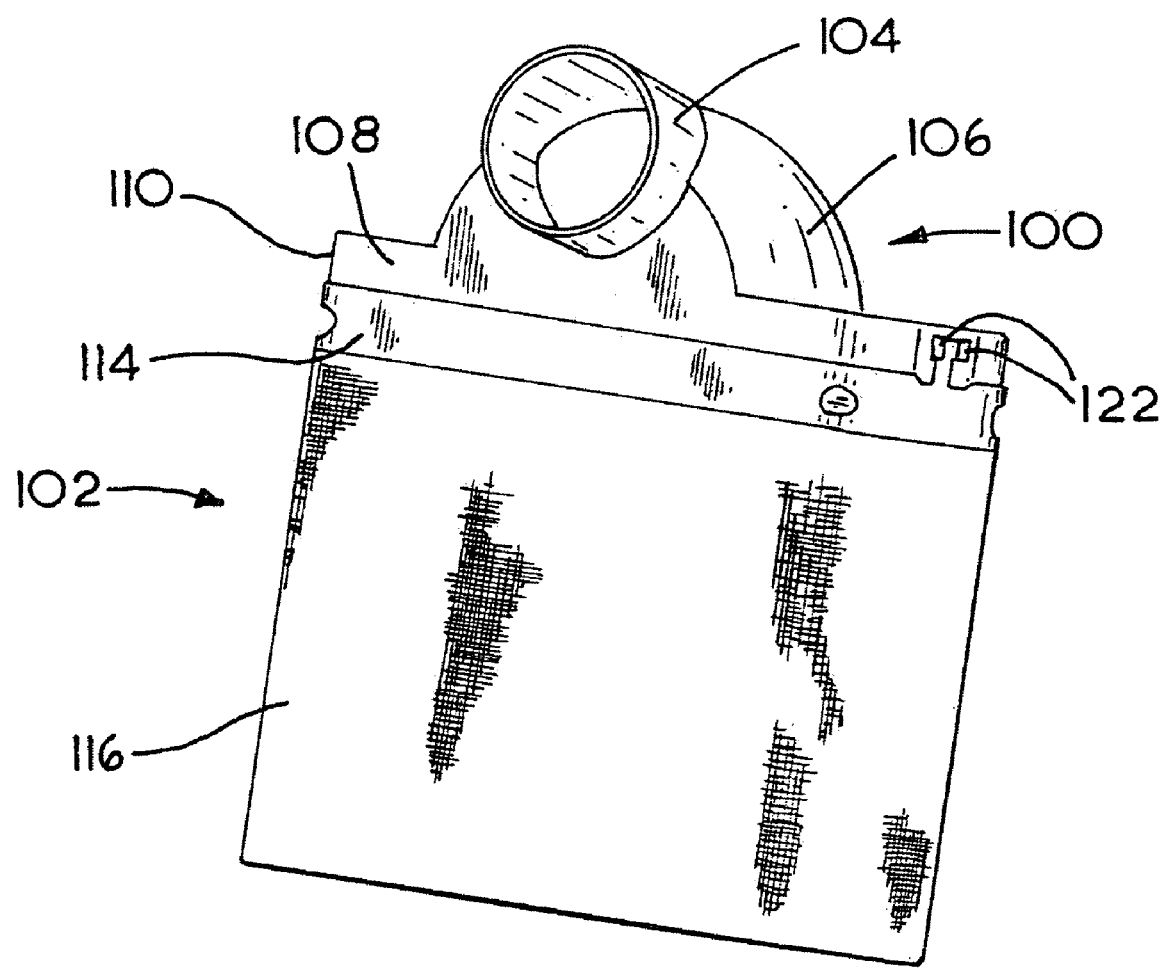
FIG. 9 shows a side view of the second embodiment of the debris collection container.
Figure 10:
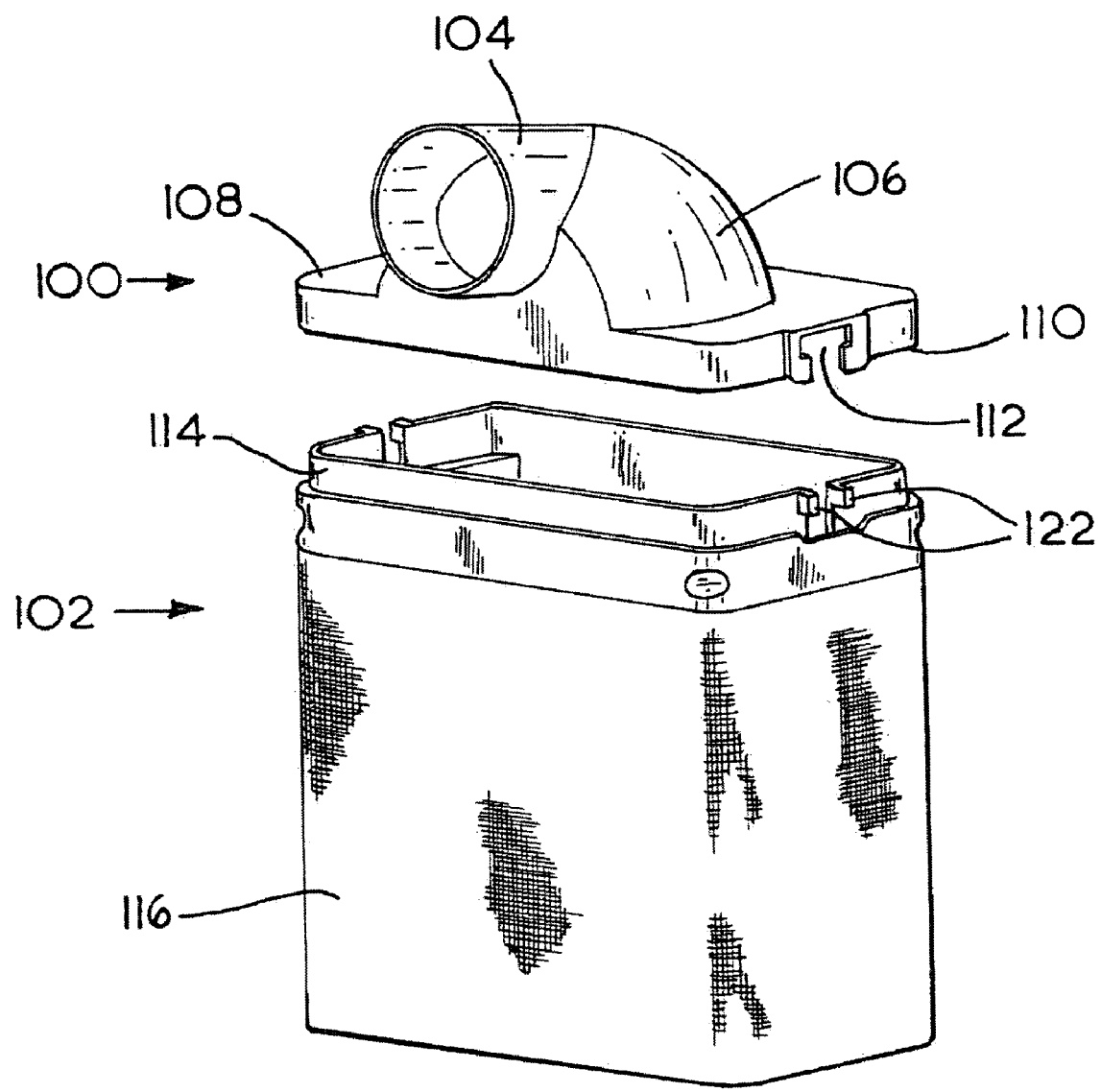
FIG. 10 shows a side view of the debris collection container of FIG. 9 with the cap detached.
Figure 11:
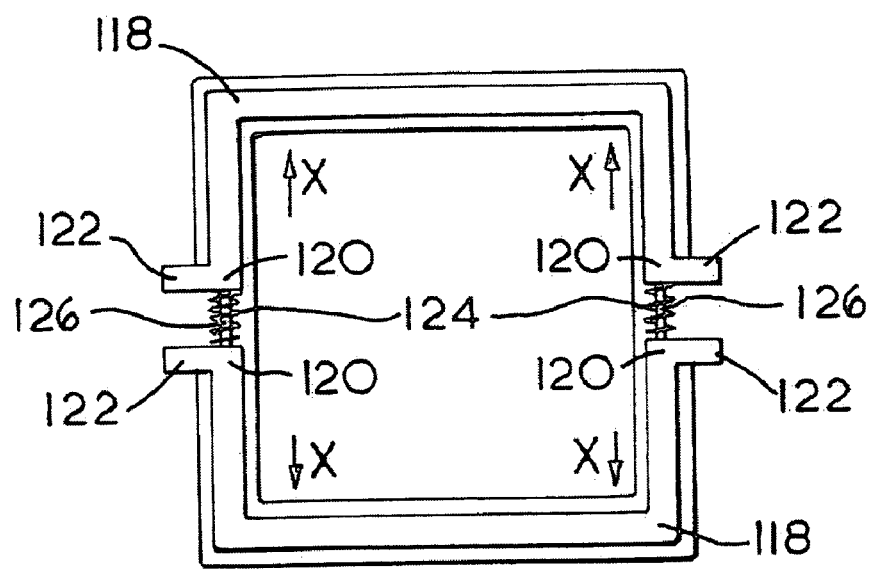
FIG. 11 shows a sketch of the connection mechanism of the debris collection container of FIG. 9.

Referring to FIGS. 9 to 11, a second embodiment of the debris collection container is shown. The debris collection container comprises an end cap 100 and a receptacle 102 which is capable of being attached to the end cap 100. The end cap 100 is manufactured in a one-piece construction from transparent plastic. The end cap 100 comprises a tubular connection section 104 which connects to the first outer section 28 of the deflector 26. The tubular connection section 104 has a circular aperture at one end whilst the other end meets with a dome shaped or semi-spherical section 106. The dome shape section 106 is mounted on a rectangular base 108 which comprises a rectangular rim 110 which surrounds a large aperture formed in the base of the dome shape section 106. The rim 110 comprises a T-shaped slot 112 which forms part of a connection system for use in connecting the end cap 100 to the receptacle 102. Air and entrained debris pass through the aperture in the end of the tubular connection section 104, through the tubular connection section and into the dome shape section 106 before being expelled from the end cap 100 through the large aperture in the base 108 of the dome. The shape of the dome 106 is such that it acts as a deflector for the air and entrained debris and causes it to bend through ninety degrees so that the air and entrained debris are travelling perpendicular to the direction they were travelling in when they were passing through the tubular connection section 104. By constructing the end cap 100 in transparent plastic, the operator of the planer can look into the debris collection container to determine how full the container is. Furthermore, as the planer is operating, the operator will be able to see the entrained debris passing through the tubular connection section and pass through the dome section thereby enabling the operator to see that the planer is working correctly.

The receptacle comprises a rectangular plastic frame 114 which acts as an entrance for the receptacle 102. Attached to the rectangular plastic frame 114 is a large rectangular metal frame (not shown) made from stiff metal wire which forms of the structure of the receptacle. Attached to the rectangular plastic frame 114 and covering the large rectangular metal frame is a bag 116 made from cloth. The use of a cloth bag covering a metal frame is well know whether such will not be discussed any further.

Mounted within the rectangular plastic frame are two C shaped locking members 118 as shown in FIG. 11 which are used to lock the receptacle 102 to the end cap 100. The method of mounting is not shown. The two C shaped locking members 118 are mounted within the rectangular plastic frame 114 so that the ends 120 of each of the two arms of the C shaped locking members 118 face each other as shown in FIG. 11. Formed on the ends of the two arms of the two C shaped locking members 118 are pegs 122 which project outwardly. Helical springs 124 are mounted between the ends 120 of each pair of corresponding arms in order to bias the two C shaped locking members 118 outwardly away from each other as indicated by Arrows X. Rod s126 is mounted within the helical springs to keep the helical springs 124 in position. Holes are formed within the rectangular plastic frame to enable the fingers of an operator to engage with the two C shaped locking members to push them towards each other against the biasing force of the springs 124.

In order to attach the receptacle 102 to the end cap 100, an operator would squeeze the two C shaped locking members 118 together against the biasing force of the springs 124 moving the pegs 122 formed on the ends 120 of the arms 118 of each of the two C shaped locking mechanisms 118 towards each other. Whilst held in this position, the pegs 122 are able to pass through the entrance of the T-shaped slot 112 in the end cap 100. The operator can then the push the end cap 100 towards the receptacle 102, the pegs 122 moving further into the T-shaped slot 112 until they become aligned with the top section of the T-shaped slot 112. The operator then releases the C shaped locking members 118 to allow them to move outwardly due to the biasing force of the springs 124 causing the pegs 122 to travel outwardly in the top section of the T-shaped slot 112 thus locking the receptacle 102 to the end cap 100.

Figure 12:
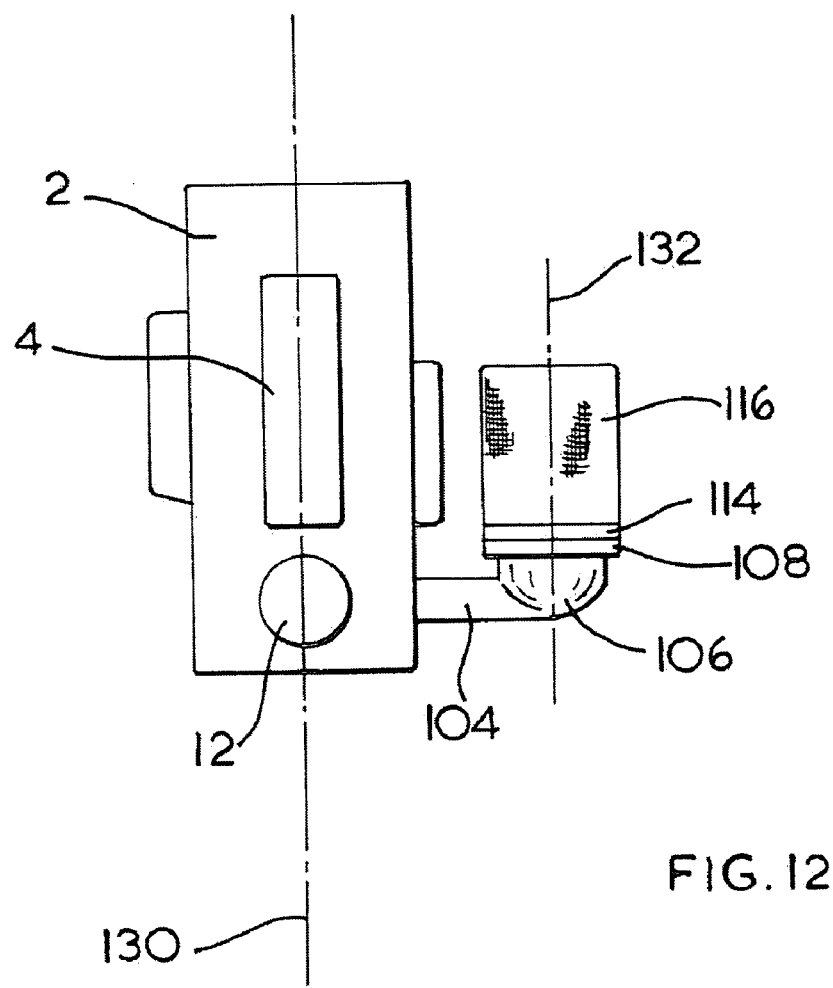
FIG. 12 shows a sketch of a top view of the planer of FIG. 1 with the debris collection container of FIG. 9 attached.

FIG. 12 shows a view of the second embodiment of the debris collection container attached to the planer. As can be seen, the debris collection container is located along side the planer and the longitudinal axis 132 of the debris container extends in parallel to the longitudinal axis 130 of the planer.

The invention claimed is:

1. A planer comprising:
   a shoe, the shoe defining an aperture;
   a body mounted on the shoe, the body defining an exhaust aperture and including a wall, the wall defining a recess;
   a cutting drum rotatably mounted within the recess, the drum having a periphery and a portion of the periphery of the cutting drum projects through the aperture in the shoe;
   a motor mounted within the body to rotatingly drive the cutting drum;
   a cutting blade mounted on the periphery of the drum and adapted for cutting a work piece when the drum is rotating, the cutting action of the blade causing debris created by the cutting to be ejected from the recess;
   an airflow generator for producing an airflow within the body;
   a conduit defined within the body for directing the airflow; the conduit in communication with the exhaust aperture and connected to the recess for entraining and removing debris ejected from the recess;
   a removable deflector insertable through the exhaust aperture and connectable to the conduit for guiding the airflow and entrained debris from within the body to outside of the body;
   a flap operatively connected to the body and movable from a first position where the flap closes the exhaust aperture to a second position where the flap does not close the exhaust aperture; and
   a spring that biases the flap in the first position.

2. The planer of claim 1 wherein the exhaust aperture defines a first exhaust aperture and a second exhaust aperture in communication with the conduit, and in the first position the flap closes the first exhaust aperture and in the second position the flap does not close the first exhaust aperture, and the flap is further movable to a third position wherein the flap closes the second exhaust aperture, the removable deflector is insertable through one of the first exhaust aperture and the second exhaust aperture.

3. The planer of claim 2 wherein, when the flap is located in the first position and the deflector is removed from the body, the flap directs the airflow and entrained debris through the second exhaust aperture.

4. The planer of claim 1 wherein the flap is pivotally mounted within the body and pivotable between the first position and the second position.

5. The planer of claim 4 wherein the flap extends from a pivot axis to a side of the body.

6. The planer of claim 1 wherein the wall in the body also defines an expulsion aperture and the conduit is connected to the recess by the expulsion aperture, and the cutting action of the blade causes debris created by the cutting to be ejected from the recess through the expulsion aperture and into the conduit substantially along a first direction, and the airflow in the conduit is directed within the body to a point below the expulsion aperture and then is directed by the conduit to be blown across the expulsion aperture substantially along a second direction where the first direction of the debris and the second direction of the airflow intersect at an acute angle.

7. The planer of claim 6 wherein the wall defining the expulsion aperture also defines a top portion of the expulsion aperture, said top portion located at a height above the shoe, and the planer body further defines a nozzle located within the conduit at substantially the same height as the top portion of the expulsion aperture, and the conduit divides the airflow into a first part and a second part, the first part of the airflow passes the point below the expulsion aperture before flowing past the expulsion aperture, and the second part of the airflow passes through the nozzle and then exits the nozzle in a substantially third direction, and the third direction of nozzle airflow and the first direction of the debris intersect at an acute angle.

8. The planer of claim 6 wherein the conduit directs the airflow over the removable deflector prior to directing the airflow to the point below the expulsion aperture.

9. The planer of claim 8 wherein the removable deflector defines a portion of the conduit where the airflow passes over the deflector.

10. The planer of claim 1 wherein the deflector includes an inner end and an outer end, and the deflector is engageable with the planer body at a downward slope from the outer end to the inner end.

* * * * *